US012765604B2

(12) United States Patent
Li et al.

(10) Patent No.: US 12,765,604 B2
(45) Date of Patent: Oct. 20, 2026

(54) AEROSOL GENERATING APPARATUS

(71) Applicant: SHENZHEN FIRST UNION TECHNOLOGY CO., LTD., Shenzhen (CN)

(72) Inventors: Xinjun Li, Shenzhen (CN); Ruilong Hu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

(*) Notice: Subject to any disclaimer, the term of this patent is extended or adjusted under 35 U.S.C. 154(b) by 758 days.

(21) Appl. No.: 18/256,214

(22) PCT Filed: Dec. 8, 2021

(86) PCT No.: PCT/CN2021/136484
§ 371 (c)(1),
(2) Date: Jun. 7, 2023

(87) PCT Pub. No.: WO2022/121948
PCT Pub. Date: Jun. 16, 2022

(65) Prior Publication Data

US 2024/0016220 A1 Jan. 18, 2024

(30) Foreign Application Priority Data

Dec. 8, 2020 (CN) ......................... 202022975947.8

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/53* (2020.01); *H02J 50/10* (2016.02); *H05B 6/105* (2013.01)

(58) Field of Classification Search
CPC .......... H02J 50/10; A24F 40/20; A24F 40/53; A24F 40/465
(Continued)

(56) References Cited

U.S. PATENT DOCUMENTS 4,716,274 A * 12/1987 Gilliland .............. B23K 9/1068 219/130.21
5,057,665 A * 10/1991 Gilliland .............. B23K 9/1087 219/130.21
(Continued)

FOREIGN PATENT DOCUMENTS

CN 201947520 U 8/2011
CN 203691665 U 7/2014
(Continued)

*Primary Examiner* — Jimmy Chou
(74) *Attorney, Agent, or Firm* — Proi Intellectual Property US

(57) ABSTRACT

An aerosol generation device includes: a chamber to receive an aerosol generation product; a cell, including a first electrode and a second electrode; a first switch tube and a second switch tube; an LCC oscillator, including an inductance coil, a first capacitor, and a second capacitor; a first end of the inductance coil is connected to the second end of the first capacitor, and a second end of the inductance coil is connected to the first electrode through the first switch tube and is connected to the second electrode through the second switch tube; and the first switch tube and the second switch tube are turned on and turned off alternately, to guide an alternating current to flow through the inductance coil to generate a variable magnetic field; and a susceptor, config-
(Continued)

ured to be penetrated by the variable magnetic field to generate heat, to heat the aerosol generation product.

17 Claims, 5 Drawing Sheets

(51) Int. Cl.
*A24F 40/53* (2020.01)
*H02J 50/10* (2016.01)
*H05B 6/10* (2006.01)

(58) Field of Classification Search
USPC .......................................................... 219/634
See application file for complete search history.

(56) References Cited

U.S. PATENT DOCUMENTS 5,073,695 A * 12/1991 Gilliland .............. B23K 9/1087 219/130.51
5,539,178 A * 7/1996 Taneda ................... B23H 1/022 219/69.13
6,598,604 B1 * 7/2003 Seakins ................ H02H 1/0015 219/481
2006/0138099 A1 * 6/2006 Namiki ............... C23C 16/0272 219/121.43
2009/0230117 A1 * 9/2009 Fernando ................ A24F 40/40 219/490
2017/0347715 A1 12/2017 Mironov et al.
2019/0297949 A1 10/2019 Mironov et al.
2020/0154531 A1 * 5/2020 Kwack ..................... H05B 6/36
2022/0125119 A1 * 4/2022 Fernando ................ A24F 40/50

FOREIGN PATENT DOCUMENTS

CN 105992528 A 10/2016
CN 110891442 A 3/2020
CN 210404849 U 4/2020
CN 214431831 U 10/2021
EP 3520637 A1 8/2019
JP 55161396 A 12/1980
JP 2013110855 A 6/2013
JP 2014211653 A 11/2014
JP 2016046973 A 4/2016
JP 2016181518 A 10/2016
JP 2017519492 A * 7/2017 ........... H05B 1/0244
JP 2020004540 A 1/2020
JP 2020064719 A 4/2020

* cited by examiner

AEROSOL GENERATING APPARATUS

CROSS-REFERENCE TO RELATED APPLICATIONS

This application claims priority to Chinese Patent Application No. 202022975947.8, filed with the China National Intellectual Property Administration on Dec. 8, 2020 and entitled “AEROSOL GENERATION DEVICE”, which is incorporated herein by reference in its entirety.

TECHNICAL FIELD

Embodiments of this application relate to the field of electromagnetic induction type heat not burn cigarette devices, and in particular, to an aerosol generation device.

BACKGROUND

Tobacco products (such as cigarettes, cigars, and the like) burn tobacco during use to produce tobacco smoke. Attempts are made to replace these tobacco-burning products by making products that release compounds without burning.

An example of this type of products is a heating apparatus that releases compounds by heating rather than burning materials. For example, the materials may be tobacco or other non-tobacco products. These non-tobacco products may include or not include nicotine. In known apparatuses, a heater that generates heat through electromagnetic induction heats a tobacco product to generate aerosols for inhalation. In an embodiment of the heating apparatus in the related art, Patent No. 201580007754.2 proposes an induction heating apparatus that heats purpose-made cigarette products through electromagnetic induction. Specifically, an alternating current is formed by connecting an induction coil and a capacitor in series or in parallel to form LC oscillation, so that the coil generates an alternating magnetic field to induce a susceptor to generate heat, so as to heat the cigarette product.

SUMMARY

An embodiment of this application provides an aerosol generation device, configured to heat an aerosol generation product to generate aerosols for inhalation, and including:

a chamber, configured to receive the aerosol generation product;

a cell, including a first electrode and a second electrode;

a first switch tube and a second switch tube;

an LCC oscillator, including an inductance coil, a first capacitor, and a second capacitor, where a first end of the first capacitor is connected to the first electrode, and a second end of the first capacitor is connected to a first end of the second capacitor; a second end of the second capacitor is connected to the second electrode; a first end of the inductance coil is connected to the second end of the first capacitor, and a second end of the inductance coil is connected to the first electrode through the first switch tube and is connected to the second electrode through the second switch tube; and the first switch tube and the second switch tube are configured to be turned on and turned off alternately, to guide an alternating current to flow through the inductance coil, so as to drive the inductance coil to generate a variable magnetic field; and a susceptor, configured to be penetrated by the variable magnetic field to generate heat, to heat the aerosol generation product received in the chamber.

The aerosol generation device forms inversion by using an LCC oscillator, which has a lower resonant frequency and higher efficiency when compared with an LC oscillator.

In a preferred implementation, the first switch tube and the second switch tube are configured to guide the alternating current through cycles; and each cycle includes:

a positive half part, where the first switch tube is turned on and the second switch tube is turned off, to recharge the first capacitor after the first capacitor is discharged and the second capacitor is charged, so as to guide the current in a positive direction of the inductance coil; and a negative half part, where the first switch tube is turned off and the second switch tube is turned on, to recharge the second capacitor after the first capacitor is charged and the second capacitor is discharged, so as to guide the current in a negative direction of the inductance coil.

In a preferred implementation, the first switch tube and the second switch tube are turned on and turned off according to a zero current switch inverter topology, to guide the alternating current to flow through the inductance coil.

In a preferred implementation, the LCC oscillator is always kept to be weak inductive.

In a preferred implementation, the first switch tube and the second switch tube are switched at different times.

In a preferred implementation, a time at which one of the first switch tube and the second switch tube is turned off is earlier than a time at which the other is turned on.

In a preferred implementation, the first capacitor and the second capacitor have an equal capacitance value.

In a preferred implementation, a maximum voltage of the first capacitor and/or the second capacitor is greater than an output voltage of the cell.

In a preferred implementation, the first capacitor includes at least two capacitors connected in series; and/or the second capacitor includes at least two capacitors connected in parallel.

In a preferred implementation, the aerosol generation device further includes:

a controller, configured to control turn-on and turn-off of the first switch tube and the second switch tube in a PWM manner.

In a preferred implementation, the aerosol generation device further includes:

a resistor, where the second end of the second capacitor and a second end of the second switch tube are connected to the second electrode of the cell through the resistor;

an overcurrent monitoring unit, configured to monitor a current flowing through the resistor; and a controller, configured to control the first switch tube and the second switch tube to be turned off when the current flowing through the resistor is greater than a threshold.

Another embodiment of this application further provides an aerosol generation device, configured to heat an aerosol generation product to generate aerosols for inhalation, and including:

a chamber, configured to receive the aerosol generation product;

an inductance coil, a first capacitor, and a second capacitor, where the first capacitor and the inductance coil are connected in series to form a first LC oscillator, and the second capacitor and the inductance coil are connected in series to form a second LC oscillator;

a transistor switch, configured to guide the first LC oscillator and the second LC oscillator to oscillate through a zero current switch inverter topology, to form an alternating current flowing through the inductance coil, so as to drive the inductance coil to generate a variable magnetic field; and a susceptor, configured to be penetrated by the variable magnetic field to generate heat, to heat the aerosol generation product received in the chamber.

BRIEF DESCRIPTION OF THE DRAWINGS

One or more embodiments are exemplarily described with reference to the corresponding figures in the accompanying drawings, and the descriptions do not constitute a limitation to the embodiments. Components/modules and steps in the accompanying drawings that have same reference numerals are represented as similar components/modules and steps, and unless otherwise particularly stated, the figures in the accompanying drawings are not drawn to scale.

DETAILED DESCRIPTION

For ease of understanding of this application, this application is described in more detail below with reference to the accompanying drawings and specific implementations.

Figure 1:
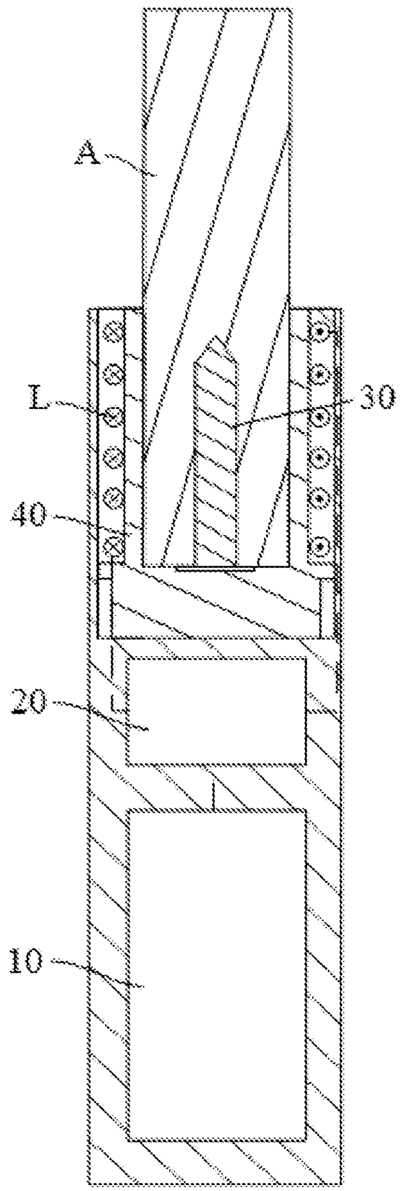
FIG. 1 is a schematic structural diagram of an aerosol generation device according to an embodiment of this application.

An embodiment of this application provides an aerosol generation device whose structure may refer to FIG. 1, including:

a chamber, where an aerosol generation product A is removably received in the chamber;

an inductance coil L, configured to generate a variable magnetic field under an alternating current;

a susceptor 30, where at least a part of the susceptor extends in the chamber, and the susceptor is configured to be inductively coupled to the inductance coil L and be penetrated by the variable magnetic field to generate heat, to heat the aerosol generation product A such as a cigarette, so that at least one component of the aerosol generation product A is volatilized, to form aerosols for inhalation;

a cell 10, being a rechargeable direct current cell, and configured to output a direct current; and a circuit 20, connected to the rechargeable cell 10 through a suitable current, and configured to convert the direct current outputted by the cell 10 into an alternating current with a suitable frequency and supply the alternating current to the inductance coil L.

According to settings used in a product, the inductance coil L may include a cylindrical inductor coil wound into a sprial shape, as shown in FIG. 1. The cylindrical inductance coil L wound into the spiral shape may have a radius r ranging from about 5 mm to about 10 mm, and the radius r specifically may be about 7 mm. The cylindrical inductance coil L wound into the spiral shape may have a length ranging from about 8 mm to about 14 mm, and a number of turns of the inductance coil L may range from 8 to 15. Correspondingly, an inner volume may range from about 0.15 $cm^3$ to about 1.10 $cm^3$.

In a more preferred implementation, the frequency of the alternating current supplied by the circuit 20 to the inductance coil L ranges from 80 KHz to 400 KHz; and more specifically, the frequency may approximately range from 200 KHz to 300 KHz.

In a preferred embodiment, a direct current supply voltage provided by the cell 10 ranges from about 2.5 V to about 9.0 V, and an amperage of the direct current that the cell 10 can provide ranges from about 2.5 A to about 20 A.

In a preferred embodiment, the susceptor 30 is in a shape of a pin or a blade in general, which is conducive to insertion into the aerosol generation product A. In addition, the susceptor may have a length of about 12 mm, a width of about 4 mm, and a thickness of about 0.5 mm, and may be made of stainless steel of level 430 (SS430). In an alternative embodiment, the susceptor 30 may have a length of about 12 mm, a width of about 5 mm, and a thickness of about 0.5 mm, and may be made of stainless steel of level 430 (SS430). In other variant embodiments, the susceptor 30 may be constructed as a cylindrical or tubular shape; and an internal space of the susceptor during use forms the chamber configured to receive the aerosol generation product A, and the aerosols for inhalation are generated in a manner of heating an outer periphery of the aerosol generation product A. The susceptor may also be made of stainless steel of level 420 (SS420) and an alloy material (such as permalloy) containing iron and nickel.

In an embodiment shown in FIG. 1, the aerosol generation device further includes a holder configured to arrange the inductance coil L and the susceptor 30, and a material of the holder may include a non-metal material with high temperature resistance such as PEEK or ceramic. During implementations, the inductance coil L is fixed on an outer wall of the holder 40 in a winding manner. In addition, as shown in FIG. 1, the holder 40 is in a shape of a hollow tube, and some space of the hollow tube forms the chamber configured to receive the aerosol generation product A.

In an optional implementation, the susceptor 30 is made of a susceptive material, or obtained by forming a susceptive material coating on an outer surface of a heat-resistant substrate material such as ceramic through plating or deposition.

Figure 2:
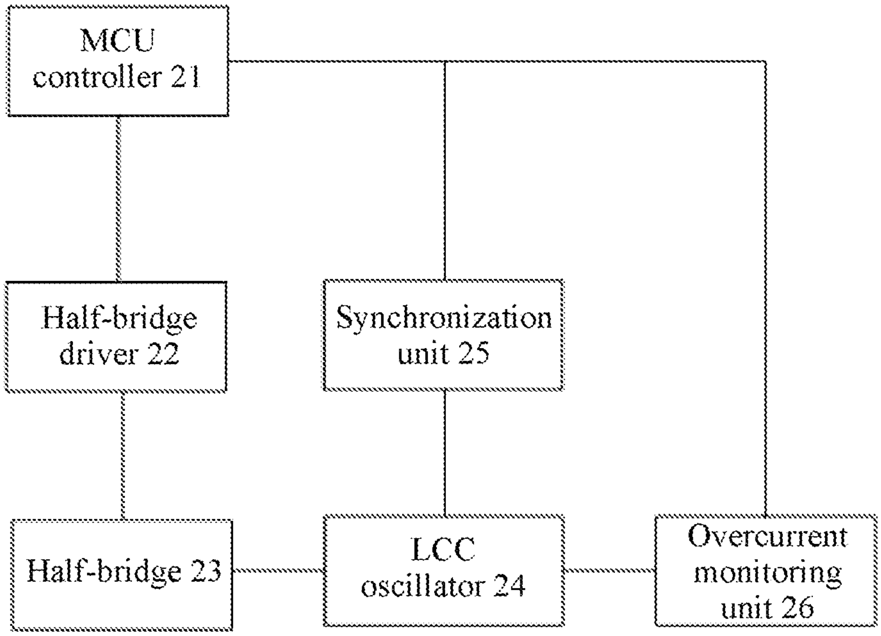
FIG. 2 is a structural block diagram of a circuit in FIG. 1 according to an embodiment.
Figure 3:
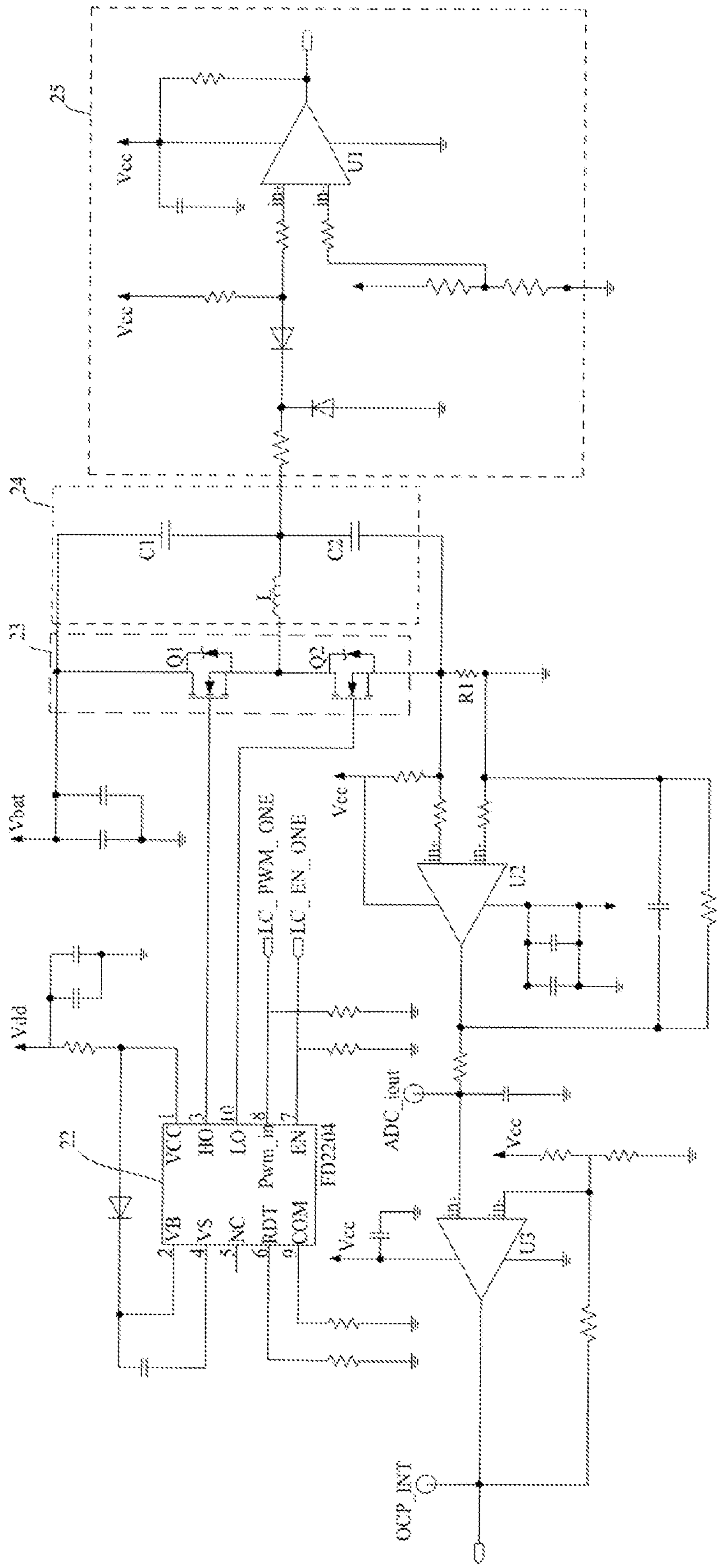
FIG. 3 is a schematic diagram of basic components of the circuit in FIG. 2 according to an embodiment.

For a structure and basic components of the circuit 20 in a preferred implementation, reference may be made to FIG. 2 and FIG. 3, including:

an LCC oscillator 24, where the LCC oscillator 24 includes the inductance coil L, a first capacitor C1, and a second capacitor C2; and the LCC oscillator 24 is configured to generate an alternating current flowing through the inductance coil L during oscillation, to cause the inductance coil L to generate an alternating magnetic field to induce the susceptor 30 to generate heat;

a half-bridge 23, being a half-bridge circuit including transistor switches, where the half-bridge includes a switch tube Q1 and a switch tube Q2, and is configured to perform alternate switching between turn-on and turn-off to cause the LCC oscillator 24 to oscillate; and a half-bridge driver 22, configured to control the switch tube Q1 and the switch tube Q2 of the half-bridge 23 to be alternately turned on and turned off according to a control signal of an MCU controller 21.

For a complete connection manner and a detailed oscillation process of the LCC oscillator 24 in the foregoing embodiment, reference may be made to FIG. 3. Specifically:

In term of connection, a first end of the first capacitor C1 is connected to a positive electrode of the cell 10, and a second end of the first capacitor is connected to a first end of the second capacitor C2; a second end of the second capacitor C2 is connected to the ground through a resistor R1;

a first end of the switch tube Q1 of the half-bridge 23 is connected to the positive electrode of the cell 10, a second end of the switch tube Q1 is connected to a first end of the switch tube Q2, and a second end of the switch tube Q2 is connected to the ground through the resistor R1, where certainly, controlled ends of the switch tube Q1 and the switch tube Q2 are both connected to the half-bridge driver 22, so that the switch tubes are turned on and turned off under driving of the half-bridge driver 22; and a first end of the inductance coil L is connected to the second end of the switch tube Q1, and a second end of the inductance coil L is connected to the second end of the first capacitor C1. In addition, in term of hardware selection of the LCC oscillator 24, maximum voltage values of the first capacitor C1 and the second capacitor C2 are far greater than an output voltage value of the cell 10. For example, in a general implementation, a used output voltage of the cell 10 is basically about 4 V, and used maximum voltages of the first capacitor C1 and the second capacitor C2 range from 30 V to 80 V.

According to the LCC oscillator 24 in the foregoing structure, in state switching of the switch tube Q1 and the switch tube Q2, connection states between the first capacitor C1 and the second capacitor C2 with the inductance coil L are variable. Specifically, in FIG. 3, when the switch tube Q1 is turned on and the switch tube Q2 is turned off, the first capacitor C1 and the inductance coil L jointly form a closed series LC loop, and the second capacitor C2 and the inductance coil L form a series LC loop with two ends respectively connected to positive and negative electrodes of the cell 10. When the switch tube Q1 is turned off and the switch tube Q2 is turned on, formed loops are reverse to the foregoing states, the first capacitor C1 and the inductance coil L form a series LC loop with two ends respectively connected to the positive and negative electrodes of the cell 10, and the second capacitor C2 and the inductance coil L jointly form a closed series LC loop. Under different states, the first capacitor C1 and the second capacitor C2 can both form respective LC loops with the inductance coil L. However, in the respective LC loops during oscillation, directions and periods of generated currents flowing through the inductance coil L are the same, and the currents jointly form an alternating current flowing through the inductance coil L.

Figure 4:
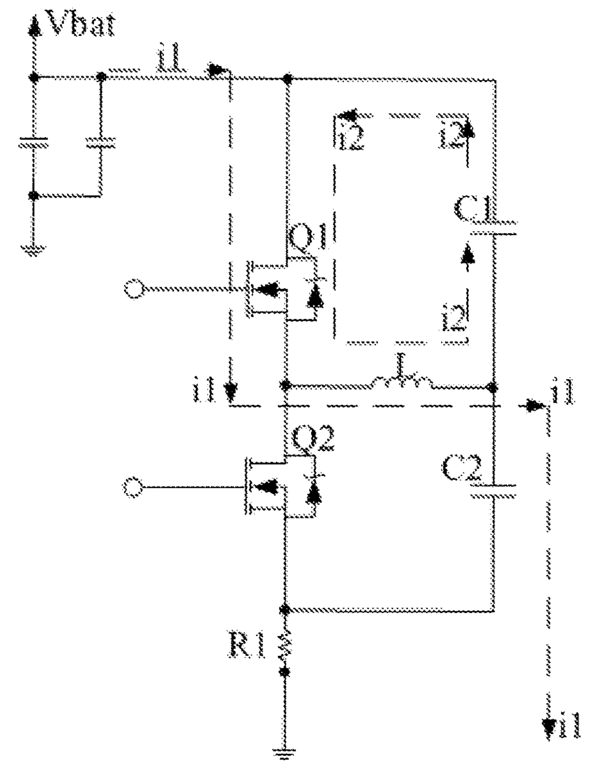
FIG. 4 is a schematic diagram of a forward current in a stage of an LCC oscillator in FIG. 3.

Specifically, steps for controlling an oscillation process having the foregoing LCC oscillator 24 are different from those for a conventional series or parallel LC oscillator. Further, in a preferred implementation of this application, a complete oscillation process of the LCC oscillator 24 is described by using switching actions of the switch tube Q1 and the switch tube Q2. The process includes:

S10. The switch tube Q1 is turned on, and the switch tube Q2 is kept in a turn-off state. In this state, the LCC oscillator 24 completes the following two processes. Specifically:

S11. As shown in FIG. 4, when the switch tube Q1 is turned on and the switch tube Q2 is turned off, the cell 10 charges the second capacitor C2 through a current i1, and the first capacitor C1 is discharged through a current i2. In this process, a current flowing from left to right through the inductance coil L shown in FIG. 4 is formed, which may be denoted as a current in a forward direction. In the stage S11, when the first capacitor C1 is turned on by the switch tube Q1, discharging is started until a voltage difference on two ends is 0 to complete discharging, and charging is ended when voltages on two ends of the second capacitor C2 are increased to be equal to the output voltage of the cell 10. In this case, the current through the inductance coil L reaches a resonant peak value.

S12. After the stage S11 is completed, the state that the switch tube Q1 is turned on and the switch tube Q2 is turned off is kept, the inductance coil L discharges in a direction same as the current i2 in FIG. 1 to charge the first capacitor C1, so that the current flowing through the inductance coil L in the forward direction is gradually decreased until the current through the inductance coil L is discharged to 0. In this stage, because the first capacitor C1 is completely discharged in the stage S11, and a loop formed by the inductance coil L and the first capacitor C1 through the switch tube Q1 basically has no impedance, in the stage S12, the inductance coil L mainly discharges to charge the first capacitor C1, and a current flowing through the inductance coil L during discharging is the same as the current i2 in the stage S11. In the stage S11, the second capacitor C2 has been basically charged to be equal to the output voltage of the cell 10. Therefore, in the stage S12, the inductance coil L may slightly compensate the second capacitor C2, but the compensation may be basically ignored.

In complete processes of the stage S11 and the stage S12, a total current flowing through the inductance coil L is increased from 0 to a maximum value in the forward direction, and is then gradually decreased to 0 through discharging of the inductance coil L, where a direction of the current flowing through the inductance coil L is always in the forward direction from left to right.

Figure 5:
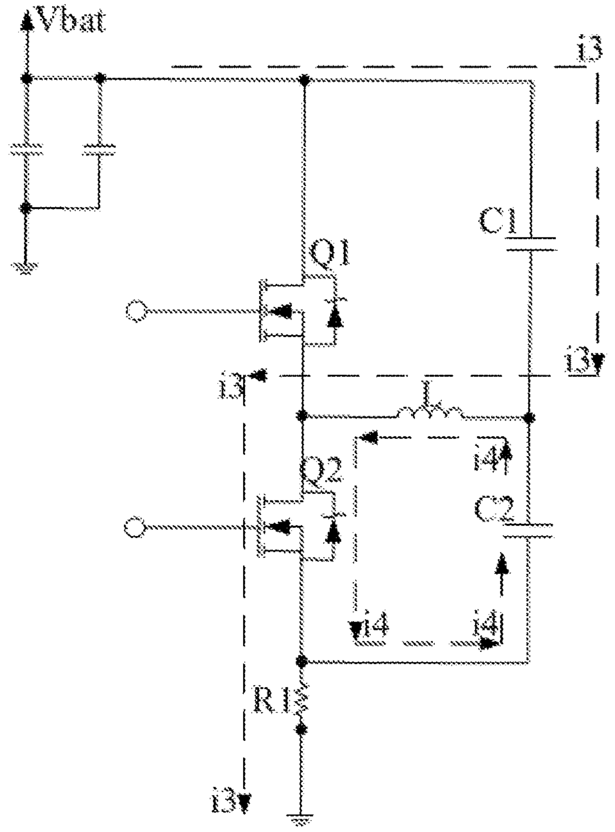
FIG. 5 is a schematic diagram of a reverse current in a stage of the LCC oscillator in FIG. 3.

S20. After step S10 is completed, the switch tube Q1 is turned off and the switch tube Q2 is turned on, to complete processes of the two following stages. Specifically:

S21. Starting from the turn-on of the switch tube Q2, loops of a current i3 and a current i4 shown in FIG. 5 are generated in the LCC oscillator 24. According to current paths shown in FIG. 5, the current i3 flows from the positive electrode of the cell 10 through the first capacitor C1, the inductance coil L, and the switch tube Q2 sequentially to the negative electrode of the cell 10 by being connected to the ground to form a loop; and at the same time, the current i4 flows from a positive end of the second capacitor C2 through the inductance coil L and the switch tube Q2 in an anticlockwise direction shown in the figure to a negative end of the second capacitor C2 to form a loop. In this process, a current flowing through the inductance coil L from right to left shown in FIG. 5 is formed, which is opposite to the current direction in FIG. 4 and may be denoted as a current in a reverse direction.

In the stage S21, the first capacitor C1 is charged and the second capacitor C2 is discharged simultaneously. When a voltage of the first capacitor C1 is increased to be equal to the output voltage of the cell 10 and a voltage difference on two ends of the second capacitor C2 is 0, the current through the inductance coil L reaches a resonant peak value.

S22. After the stage S21 is completed, the switch tube Q2 is kept to be turned on, the inductance coil L reversely charges the second capacitor C2, so that the current flowing through the inductance coil L in the reverse direction is gradually decreased until the current through the inductance coil L is discharged to 0.

In complete processes of the stage S21 and the stage S22 in step S20, a total current flowing through the inductance coil L is also increased from 0 to a maximum value in the reverse direction, and is then gradually decreased to 0 through discharging of the inductance coil L.

Commutation of the LCC oscillator 24 during oscillation is controlled by the half-bridge 23 formed by the switch tube Q1 and the switch tube Q2. Certainly, based on a same implementation, a person skilled in the art may replace the half-bridge or use a full-bridge circuit including 4 switch tubes to drive oscillation of the LCC oscillator 24.

Figure 6:
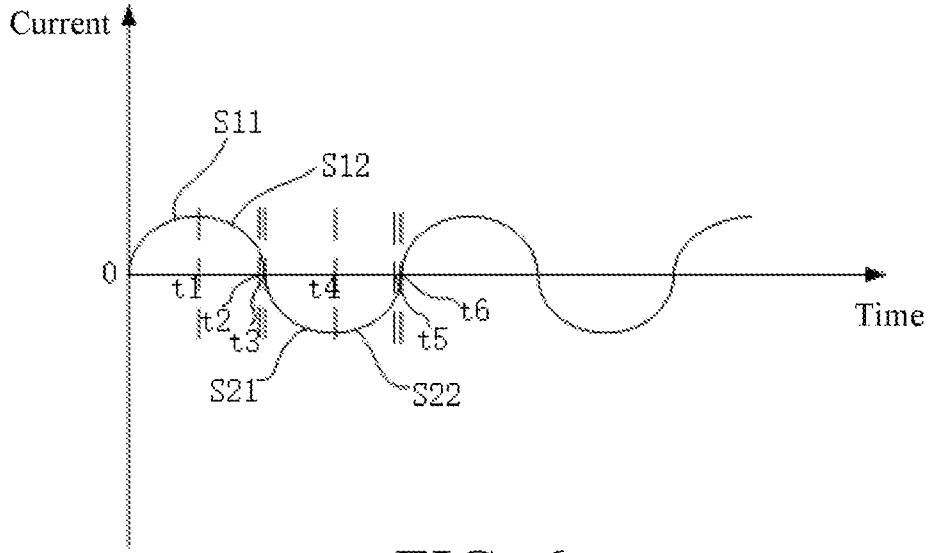
FIG. 6 is a schematic diagram of a current flowing through an inductance coil in an oscillation process of the LCC oscillator in FIG. 3.

Therefore, during oscillation of the LCC oscillator 24, for changes of the current flowing through the inductance coil L, reference may be made to FIG. 6, and a complete current period includes four parts in FIG. 6 respectively corresponding to the stages S11/S12/S21/S22. In step S10 and step S20, turn-on and turn-off states of the switch tube Q1 and the switch tube Q2 are switched circularly and alternately, so that the oscillation process of the stages S11/S12/S21/S22 may be generated in the LCC oscillator 24 circularly, to form an alternating current flowing through the inductance coil L.

Therefore, as can be seen based on the foregoing control process, the LCC oscillator 24 in this applications forms inversion according to a zero current switch (ZCS) inverter topology, which is different from a zero voltage switch (ZVS) inverter topology of existing LC oscillators. In addition, the switch tube Q1 and the switch tube Q2 are configured to perform turn-on/turn-off switching when the current flowing through the inductance coil L is 0.

In the preferred implementation shown in FIG. 3, a quantity of the first capacitors C1 and a quantity of the second capacitors C2 are both 1. In other optional implementations, the first capacitor C1 or the second capacitor C2 may each include 2 or 3 capacitors connected in parallel with smaller capacitance values. For example, when the first capacitor C1 uses a plurality of small capacitors to replace an originally required large capacitor, total capacitance values thereof are the same or approximately the same. Each of the small capacitors may correspondingly present greatly decreased and variable equivalent series resistance (ESR) when compared with a single capacitor along with changes of an oscillation frequency of the LCC oscillator 24. Specifically, when the oscillation frequency is low, the ESR is relatively high, and when the oscillation frequency is high, the ESR is relatively low, which may be conducive to prevent a spike. In addition, using the plurality of small capacitors to replace the originally required large capacitor is conducive to reduce a resonant frequency of the LCC oscillator 24.

By using the circuit 20 of the LCC oscillator 24, inversion is formed by using a ZCS technology during implementations, which basically has a half resonant frequency when compared with LC series/parallel oscillation of a single capacitor. Generally, when an LC series/parallel oscillation frequency is about 380 Hz, the oscillation frequency of the LCC oscillator 24 is about 190 KHz, which is conducive to synchronous detection and control of the MCU controller 21.

Figure 7:
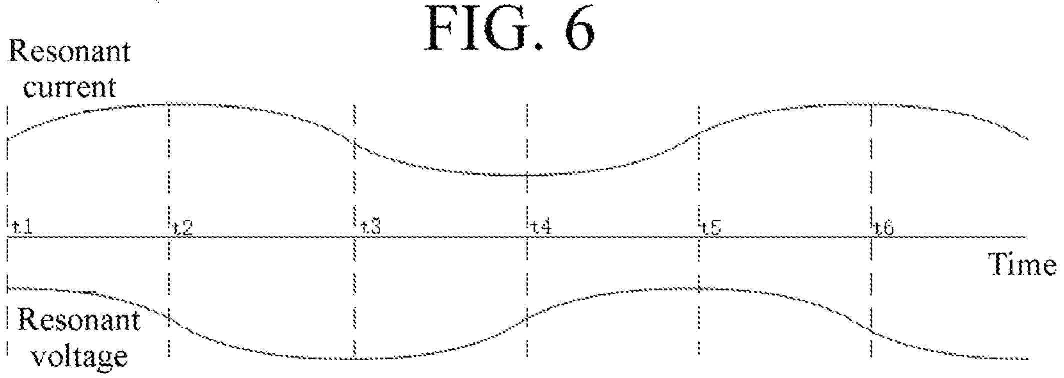
FIG. 7 is a schematic diagram of changes of a tested current and a tested voltage in an oscillation process of the LCC oscillator in FIG. 3.

In addition, in the foregoing oscillation process, changes of a resonant voltage and a resonant current of the LCC oscillator 24 obtained through detection are shown in FIG. 7. The resonant voltage is previous to the resonant current for about ¼ period, and the entire LCC oscillator 24 is weak inductive. “Capacitive” and “inductive” are electrical terms related to a series and parallel circuit (for example, the LC oscillator or the LCC oscillator 24) of an electronic device. When the capacitance of the series and parallel circuit is greater than the inductance, the circuit is capacitive, and when the inductance is greater than the capacitance, the circuit is inductive. The state of “weak inductive” refers to a state that the inductance and the capacitance are basically equal and the inductance is slightly greater than rather than far greater than the capacitance.

In a more preferred implementation, in execution processes of step S12 and step S22, the switch tube Q1/switch tube Q2 that originally needs to be turned off when the current through the inductance coil L is discharged to 0 may be turned off in advance slightly, and the other switch tube is not turned on at the same time. For example, referring to FIG. 6, in step S12, the switch tube Q1 is turned off in advance at a moment t2 that the current through the inductance coil L is discharged to be close to 0 but do not reach 0, and the switch tube Q2 is then still turned on at a moment t3 that the current through the inductance coil L is discharged to 0. During an implementation, the switch tube Q1 may be turned off about 0.1 μs to 0.5 μs early. In this case, the inductance coil L is not completely discharged to 0, and the switch tube Q2 is changed to a freewheeling state, so that few electrical energy remaining in the inductance coil L may charge the second capacitor C2. After the freewheeling state (generally referred to as a dead zone) of about 0.1 μs to 0.5 μs, the voltage difference on the two ends of the switch tube Q2 is basically completely close to 0. In this case, when the switch tube Q2 is turned on, a loss is greatly reduced and safety is greatly improved.

The foregoing manner of turning off the switch tube in advance is performed for the features that the voltage is previous to the current and the LCC is weak inductive in FIG. 7; when the switch tube is turned off exactly when the current is 0, the voltage exceeds the current, so that the LCC oscillator 24 is capacitive; and a protection or buffer region may be formed by turning off the switch tube in advance, which is conducive to eliminate unfavorable factors such as that the LCC oscillator is capacitive or the voltage is previous to the current. On one hand, turn-on/turn-off switching of the switch tube Q1/switch tube Q2 is not performed at the same time, but instead, there is a protection time different of 0.1 μs to 0.5 μs between a moment at which the switch tube Q1 is turned off and a moment at which the switch tube Q2 is turned off, to protect the safety of the switch tube to be turned on; and on the other hand, the LCC oscillator 24 is always kept in the weak inductive state, and may not be changed to a capacitive or strong inductive state to improve the efficiency.

Further, to accurately detect details such as an oscillation process and a period of the LCC oscillator 24, referring to FIG. 2 and FIG. 3, during implementations, a synchronization unit 25 is further included, configured to synchronously detect variable physical parameters such as a current, a voltage, or the period in the oscillation process of the LCC oscillator 24. Specifically, in the embodiment shown in FIG. 3, the synchronization unit 25 mainly includes an operational amplifier U1, and a signal input end for detection is connected to the second end of the inductance coil L. therefore, after processing such as diode rectification, the operational amplifier U1 may perform sampling detection on an electrical signal at the signal input end.

Alternatively, in an optional implementation, a reference signal end of the operational amplifier U1 is directly set to 0, so that the operational amplifier becomes a zero-crossing comparator configured to detect a moment at which an oscillation current of the LCC oscillator 24 is 0. The MCU controller 21 then obtains variable physical parameters such as a current, a voltage, or the period of the LCC oscillator 24 based on the detection result with reference to a zero-crossing time point shown in FIG. 6.

Further, referring to the embodiment shown in FIG. 3, the half-bridge driver 22 uses a common switch tube driver of a FD2204 model, which is controlled by the MCU controller 21 in a PWM manner, to respectively emit a high level/low level alternately through a third I/O port and a tenth I/O port based on a pulse width of PWM, to drive turn-on times of the switch tube Q1 and the switch tube Q2, so as to control oscillation of the LCC oscillator 24.

In the foregoing detailed control step, an LCC inversion process is symmetrical, and a duty cycle is close to 50%. Correspondingly, the MCU controller 21 sends a PWM control signal with the duty cycle of 50% to the half-bridge driver 22, to drive the half-bridge 23 to perform switching in this manner.

Further, referring to the preferred embodiments shown in FIG. 2 and FIG. 3, the circuit 20 further includes an overcurrent monitoring unit 26. The overcurrent monitoring unit 26 is configured to monitor a current value of a loop formed by the cell 10 and the LCC oscillator 24, namely, a main circuit, to prevent a safety problem when the current is excessively large.

In the implementation of FIG. 3, the overcurrent monitoring unit 26 is first implemented based on the resistor R1. In the LCC oscillation process, the overcurrent monitoring unit is connected to the ground through the resistor R1 to further form a loop with the negative electrode of the cell 10, and the resistor R1 is always in communication with the LCC oscillator 24 during oscillation. Further, the current of the main circuit may be obtained by detecting a voltage to ground of the resistor R1. Specifically:

in FIG. 3, the overcurrent monitoring unit 26 includes two operational amplifiers, namely, an operational amplifier U2 and an operational amplifier U3. During an implementation, one of the two operational amplifier is configured to perform comparison operation, and the other is configured to amplify an output. In a preferred implementation of FIG. 3, the operational amplifier U2 is mainly configured to sample voltage values on two ends of the resistor R1 and generate an output signal of the current value of the main circuit through operations. The operational amplifier U3 then further amplifies the signal outputted by the operational amplifier U2, and the signal is obtained by the MCU controller 21 through sampling.

Alternatively, in other variant implementations, the operational amplifier U3 is further configured to perform a comparison function, to compare the voltage signal outputted by the operational amplifier U2 with a threshold; when a comparison result indicates that the signal does not exceed the threshold, a result signal at a low level is outputted to the MCU controller 21, to indicate that the current of the main circuit is under a preset safety threshold; and when the comparison result indicates that the signal is higher than the threshold, a high level is outputted to the MCU controller 21, to indicate that the current of the main circuit is higher than the preset safety threshold, and the MCU controller 21 controls the half-bridge 23 to be turned off to stop oscillation based on the result, to ensure the safety of the main circuit.

Further, in the circuit 20 shown in FIG. 3, several resistors and capacitors that are not marked are further included, which play a role of a conventional common component for current-limiting or filtering in the circuit 20. A person skilled in the art can easily understand this, and redundant descriptions are not provided herein.

It should be noted that, the specification of this application and the accompanying drawings thereof illustrate preferred embodiments of this application, but are not limited to the embodiments described in this specification. Further, a person of ordinary skill in the art may make improvements or modifications according to the foregoing descriptions, and all the improvements and modifications shall fall within the protection scope of the appended claims of this application.

What is claimed is:

1. An aerosol generation device, configured to heat an aerosol generation product to generate aerosols for inhalation, and comprising:

- a chamber, configured to receive the aerosol generation product;
- a cell, comprising a first electrode and a second electrode;
- a first switch tube and a second switch tube;
- an LCC oscillator, comprising an inductance coil, a first capacitor, and a second capacitor, wherein a first end of the first capacitor is connected to the first electrode, and a second end of the first capacitor is connected to a first end of the second capacitor; a second end of the second capacitor is connected to the second electrode; a first end of the inductance coil is connected to the second end of the first capacitor, and a second end of the inductance coil is connected to the first electrode through the first switch tube and is connected to the second electrode through the second switch tube; and
- the first switch tube and the second switch tube are configured to be turned on and turned off alternately, to guide an alternating current to flow through the inductance coil, so as to drive the inductance coil to generate a variable magnetic field; and
- a susceptor, configured to be penetrated by the variable magnetic field to generate heat, to heat the aerosol generation product received in the chamber;
- wherein the aerosol generation device further comprises:
- a resistor, wherein the second end of the second capacitor and a second end of the second switch tube are connected to the second electrode of the cell through the resistor;
- an overcurrent monitoring unit, configured to monitor a current flowing through the resistor; and
- a controller, configured to control the first switch tube and the second switch tube to be turned off when the current flowing through the resistor is greater than a threshold.

2. The aerosol generation device according to claim 1, wherein the first switch tube and the second switch tube are configured to guide the alternating current through cycles; and each cycle comprises:

- a positive half part, wherein the first switch tube is turned on and the second switch tube is turned off, to recharge the first capacitor after the first capacitor is discharged and the second capacitor is charged, so as to guide the current in a positive direction of the inductance coil; and
- a negative half part, wherein the first switch tube is turned off and the second switch tube is turned on, to recharge the second capacitor after the first capacitor is charged and the second capacitor is discharged, so as to guide the current in a negative direction of the inductance coil.

3. The aerosol generation device according to claim 1, wherein the first switch tube and the second switch tube are turned on and turned off according to a zero current switch inverter topology, to guide the alternating current to flow through the inductance coil.

4. The aerosol generation device according to claim 1, wherein the LCC oscillator is always kept to be inductive.

5. The aerosol generation device according to claim 2, wherein the first switch tube and the second switch tube are switched at different times.

6. The aerosol generation device according to claim 5, wherein a time at which one of the first switch tube and the second switch tube is turned off is earlier than a time at which the other is turned on.

7. The aerosol generation device according to claim 1, wherein the first capacitor and the second capacitor have an equal capacitance value.

8. The aerosol generation device according to claim 7, wherein a maximum voltage of the first capacitor and/or the second capacitor is greater than an output voltage of the cell.

9. The aerosol generation device according to claim 1, further comprising:

a controller, configured to control turn-on and turn-off of the first switch tube and the second switch tube in a PWM manner.

10. The aerosol generation device according to claim 2, wherein the first switch tube and the second switch tube are turned on and turned off according to a zero current switch inverter topology, to guide the alternating current to flow through the inductance coil.

11. The aerosol generation device according to claim 2, wherein the LCC oscillator is always kept to be inductive.

12. The aerosol generation device according to claim 2, wherein the first capacitor and the second capacitor have an equal capacitance value.

13. The aerosol generation device according to claim 12, wherein a maximum voltage of the first capacitor and/or the second capacitor is greater than an output voltage of the cell.

14. The aerosol generation device according to claim 2, further comprising:

a controller, configured to control turn-on and turn-off of the first switch tube and the second switch tube in a PWM manner.

15. The aerosol generation device according to claim 1, wherein both the first capacitor and the second capacitor comprise at least two capacitors connected in parallel.

16. The aerosol generation device according to claim 1, wherein at least one of the first capacitor and the second capacitor comprises at least two capacitors connected in parallel.

17. An aerosol generation device, configured to heat an aerosol generation product to generate aerosols for inhalation, and comprising:

a chamber, configured to receive the aerosol generation product;

an inductance coil, a first capacitor, and a second capacitor, wherein the first capacitor and the inductance coil are connected in series to form a first LC oscillator, and the second capacitor and the inductance coil are connected in series to form a second LC oscillator;

a transistor switch, configured to guide the first LC oscillator and the second LC oscillator to oscillate through a zero current switch inverter topology, to form an alternating current flowing through the inductance coil, so as to drive the inductance coil to generate a variable magnetic field; and a susceptor, configured to be penetrated by the variable magnetic field to generate heat, to heat the aerosol generation product received in the chamber;

wherein the aerosol generation device further comprises:

a resistor, wherein the second end of the second capacitor and a second end of the second switch tube are connected to the second electrode of the cell through the resistor;

an overcurrent monitoring unit, configured to monitor a current flowing through the resistor; and a controller, configured to control the first switch tube and the second switch tube to be turned off when the current flowing through the resistor is greater than a threshold.

* * * * *